United States Patent
Lohr

(10) Patent No.: US 8,057,911 B2
(45) Date of Patent: Nov. 15, 2011

(54) TWIST-WRAP FILM AND USE THEREOF AS PACKAGING FILM

(75) Inventor: Waldemar Lohr, Wiesbaden (DE)

(73) Assignee: Constantia Ebert GmbH, Wiesbaden (DE)

( * ) Notice: Subject to any disclaimer, the term of this patent is extended or adjusted under 35 U.S.C. 154(b) by 117 days.

(21) Appl. No.: 11/667,830

(22) PCT Filed: Nov. 18, 2005

(86) PCT No.: PCT/EP2005/012370
§ 371 (c)(1),
(2), (4) Date: May 16, 2007

(87) PCT Pub. No.: WO2006/058621
PCT Pub. Date: Jun. 8, 2006

(65) Prior Publication Data
US 2008/0003417 A1    Jan. 3, 2008

(30) Foreign Application Priority Data
Nov. 29, 2004  (AT) ................... A 2001/2004

(51) Int. Cl.
*B32B 27/08* (2006.01)
*B65B 7/12* (2006.01)

(52) U.S. Cl. .......................... 428/515; 53/483

(58) Field of Classification Search .......... None
See application file for complete search history.

(56) References Cited

U.S. PATENT DOCUMENTS

| | | | | |
|---|---|---|---|---|
| 5,912,070 A * | 6/1999 | Miharu et al. | ............... | 428/214 |
| 2004/0157516 A1 | 8/2004 | Penttinen et al. | | |

FOREIGN PATENT DOCUMENTS

| | | |
|---|---|---|
| CA | 2276541 | 12/1999 |
| CA | 2496177 | 3/2004 |
| DE | 4304308 | 8/1994 |
| DE | 4304309 | 8/1994 |
| DE | 4304310 | 8/1994 |
| DE | 19536043 | 4/1997 |
| DE | 102 38 516 A1 | 3/2004 |
| DE | 10238515 | 3/2004 |
| DE | 10238516 | 3/2004 |
| EP | 0 773 102 A1 | 5/1997 |
| EP | 0773102 | 5/1997 |
| EP | 0 968 816 A | 1/2000 |
| EP | 0968816 | 1/2000 |
| JP | 10166529 | 6/1998 |
| JP | 11077924 | 3/1999 |
| WO | 2004/098882 A | 11/2004 |
| WO | WO 2004/098882 | 11/2004 |
| WO | WO 2006042681 | 4/2006 |

OTHER PUBLICATIONS

VDI-Verpackungsforum (Oct. 7-8, 2003, pp. 159-179, VDI Verlag GmbH, Dusseldorf, 2003).*
Brochure of Collin/Ticona distributed at the K 2004 Plastics and Rubber Fair (Hall 9, Booth 9E-76-77, Oct. 20-27, 2004).*

* cited by examiner

*Primary Examiner* — Sheeba Ahmed
(74) *Attorney, Agent, or Firm* — Young & Thompson

(57) ABSTRACT

The invention relates to a twist-wrap film (1, 2, 3) which is produced by coextrusion of a plurality of plastic layers. The inventive film is characterized in that at least a) one or more plastic layer(s) (4, 4') consist of one or more semicrystalline polyolefin(s) having a uniform structure and b) at least one additional layer from an amorphous cycloolefin copolymer (5) having a uniform structure, the layers a) and b) being in direct contact. The selection of an amorphous cycloolefin copolymer having a uniform structure in at least one layer of the inventive twist-wrap film combined with a semicrystalline polyolefin having a uniform structure allows to provide a twist-wrap film that can be easily produced and that has the rigidity required for twist-wrap packagings and a satisfactory deadfold behavior, i.e., recovery behavior.

14 Claims, 1 Drawing Sheet

TWIST-WRAP FILM AND USE THEREOF AS PACKAGING FILM

The invention relates to a twist-wrap film that can be produced by co-extrusion of several plastic layers as well as use thereof as packaging film.

For packaging sweets, such as candy, but also confectionery, it is known to use so-called twist-wrap films, whereby these films are to have a good dead fold, i.e., low shape recovery, good rigidity as well as transparency. These twist-wrap films are used for twist-wrap packagings (twist packagings), whereby the packing process is carried out so that the twist-wrap film is wrapped around the material to be packaged, the latter is laterally cut to length in sleeve form, and then the side ends are rotated so that the contents are protected from contaminants.

A packaging film that is suitable for the twist-wrapping consists of, for example, cellophane. The latter is characterized by transparency as well as high rigidity. Its production, however, is often labor-intensive and complicated.

Alternatives in this respect were found in the provision of polypropylene films; however, the latter have an unsatisfactory dead fold. This means that the packaging ends, i.e., the twisted ends, tend to fold back into their original form.

A switch was subsequently made to find suitable additives that improve the shape recovery of the twist-wrap packaging. In this case, the properties of so-called cycloolefin copolymers (COC) were used that are produced, for example, by polymerization of ethylene with norborane with the aid of metallic catalysts. Owing to the molecular structure thereof, cycloolefin copolymers are more rigid than low density polyethylene (LDPE) that is known in the art. By use of these cycloolefin copolymers in the form of polymer blends, the rigidity of the originally proposed twist packaging materials based on polyethylene or polypropylene could therefore be increased. In this connection, sets of solutions are disclosed in EP-A-920 989, DE-A1-195 36 043 as well as in JP-A-11077924. Another possibility of increasing the rigidity of the materials for twist packagings was used according to JP-A-10166529 to the effect that an adhesive layer is provided between a polypropylene film and a film that consists of cycloolefin copolymers. Although the rigidity desired for twist-packaging materials could obviously be increased by provision of COC blends or by adhesives, these measures, on the one hand, are relatively complex by the precise indication of the mixing ratios in the polymer blends and, on the other hand, by use of an additional intermediate layer in the form of an adhesive in the production of twist-wrap films (twist-packaging materials).

Here, the invention is intended to correct this.

According to the invention, a twist-wrap film of the initially-mentioned type is proposed, which is characterized in that a) one or more plastic layer(s) of partially crystalline polyolefin(s) that is/are uniform in its (their) structure, and b) at least one additional plastic layer, uniform in its structure, consists of amorphous cycloolefin copolymer, whereby the plastic layers a) and b) are in direct contact with one another.

Additional advantageous configurations of the twist-wrap film according to the invention are disclosed according to subclaims.

In addition, the invention relates to the use of a multilayer plastic film, produced by co-extrusion, that consists of a) one or more plastic layer(s) of partially crystalline polyolefin(s) that is (are) uniform in its (their) structure, and b) at least one plastic layer, uniform in its structure, of amorphous cycloolefin copolymer, whereby the plastic layers a) and b) are in direct contact with one another, as packaging film for twist packagings.

Other configurations of the use according to the invention are disclosed according to subclaims.

BRIEF DESCRIPTION OF THE DRAWINGS

The invention is explained in more detail below based on FIGS. 1 to 3 as well as based on embodiments.

The twist-wrap film according to the invention, as it is shown, for example, according to FIGS. 1 to 3, can now be produced as follows.

EXAMPLE 1

Figure 1:
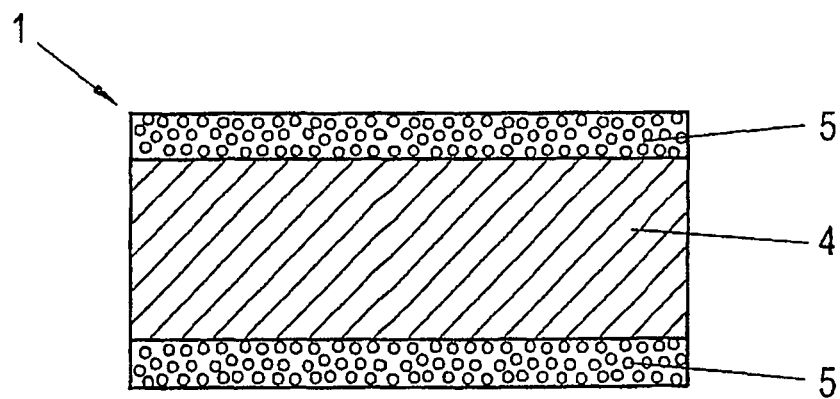
FIG. 1 shows a possible embodiment of the twist-wrap film according to the invention based on a three-layer structure (1).

In a blown-film or cast-film system, the twist-wrap film 1, as shown in FIG. 1, is produced so that by co-extrusion on an inside layer 4 that consists of polyolefin, amorphous layers 5 that consist of cycloolefin copolymers are applied on both sides. In this case, the process parameters are set such that in the three-layer structure that is formed, the cycloolefin copolymer remains in an amorphous state, and the used polyolefin remains in a partially crystalline state.

Figure 2:
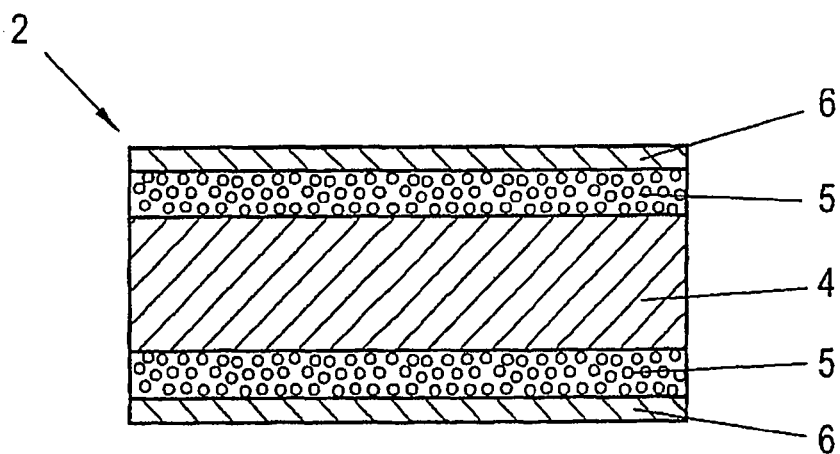
FIG. 2 shows a twist-wrap film according to the invention that is based on a five-layer structure (2).
Figure 3:
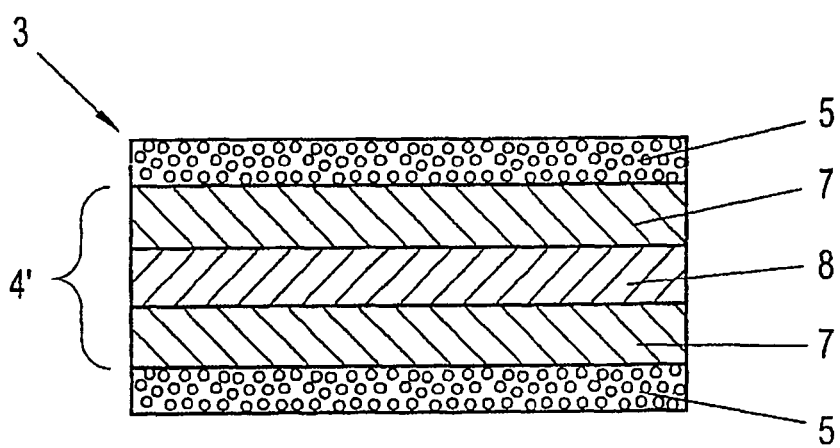
FIG. 3 shows another possible embodiment of the twist-wrap film according to the invention in which a five-layer structure (3) is present, but with an arrangement of the layers to one another that is different than FIG. 2.

By setting the machine parameters in the co-extrusion system, additional polyolefin layers 6 can be applied on both sides to the three-layer structure according to FIG. 1, so that the twist-wrap film 2, as shown in FIG. 2, is produced in the form of a five-layer structure.

As polyolefin, polypropylene (PP) as well as polyethylene (PE) are used. By further selection of monomers in the molecule chain, for example in the form of homo-PP, random-PP as well as LLDPE, additional properties, such as rigidity and dead-fold properties, can be set.

EXAMPLE 2

According to the technology described in Example 1, additional polyolefin layers 7 are applied to a core layer 8 that consists of polyolefin. In this case, the core layer 8 that is in the center consists of homo-PP and the bilaterally adjoining LLDPE layers 7. On this three-layer structure 4' that consists of different polyolefins, the layers 5 that consist of amorphous cycloolefin copolymers are then applied on both sides.

In summary, it can be said that by selection of an amorphous cycloolefin copolymer that is uniform in its structure in at least one layer of the twist-wrap film according to the invention in combination with a partially crystalline polyolefin that is uniform in its structure, on the one hand, the rigidity that is necessary for the twist-wrap packagings and, on the other hand, a satisfactory dead fold, i.e., shape recovery, can be produced, whereby the twist-wrap film can be obtained at the same time in an easily producible way.

The invention claimed is:

1. Method of packaging a material which comprises:
   providing a multilayer plastic film, produced by co-extrusion, which consists of
   a) an inner layer of partially crystalline polyolefin that is uniform in its structure,
   b) two outer layers of amorphous cycloolefin copolymer, each uniform in its structure, and each directly adjoining said partially crystalline polyolefin inner layer,
   provided that at least one additional layer consisting of a partially crystalline polyolefin that is uniform in its structure directly adjoins each of the outer layers, and
   wrapping the multilayer plastic film around the material.

2. Method according to claim 1, wherein said inner layer comprises a layer of partially crystalline polyolefin that is uniform in its structure, which, bilaterally adjoining in its structure, has different polyolefin layers in this respect and provided said amorphous cycloolefin copolymer layers, which are bilaterally uniform in their structure in each case, directly adjoin said different polyolefin layers.

3. Method according to claim 1, provided that as polyolefins, polypropylene or polyethylene are used, optionally in the form of homo-PP, random-PP or LLDPE.

4. Method according to claim 1, wherein the polyolefins are in the form of homo-PP, random-PP or LLDPE.

5. Method according to claim 1, wherein a cover layer is provided in the form of an imprint and/or a metal coating.

6. Twist-wrap film, which can be produced by co-extrusion of several plastic layers, comprising:
   one or more layers of partially crystalline polyolefin, each of which is uniform in its structure, wherein a first side of said one or more polyolefin layers is in direct contact with an amorphous cycloolefin copolymer layer, which is uniform in its structure, and further wherein an opposite side of said one or more polyolefin layers is in direct contact with an amorphous cycloolefin copolymer layer which is uniform in its structure, wherein at least one additional layer consisting of partially crystalline polyolefin, uniform in its structure, directly adjoins each of the cycloolefin copolymer layers.

7. Twist-wrap film according to claim 6, wherein said one or more layers of partially crystalline polyolefin comprise an inner layer of a first partially crystalline polyolefin and outer layers of a second partially crystalline polyolefin directly adjoining opposite sides of said inner layer, wherein said second partially crystalline polyolefin is different than said first partially crystalline polyolefin, further wherein said first side and said opposite side of said one or more layers of partially crystalline polyolefin are formed by said outer layers.

8. Twist-wrap film according to claim 6, wherein each of said one or more layers of partially crystalline polyolefin consists of polypropylene or polyethylene.

9. Twist-wrap film according to claim 6, wherein each of said one or more layers of partially crystalline polyolefin is in the form of homo-PP, random-PP or LLDPE.

10. Twist-wrap film according to claim 6, further comprising a cover layer in the form of an imprint and/or a metal coating.

11. Twist-wrap film formed from several plastic layers, which can be produced by co-extrusion, comprising:
    one or more layers of partially crystalline polyolefin, each of which is uniform in its structure, wherein a first side of said one or more polyolefin layers is in direct contact with an amorphous cycloolefin copolymer layer, which is uniform in its structure, and wherein an opposite side of said one or more polyolefin layers is in direct contact with an amorphous cycloolefin copolymer layer which is uniform in its structure;
    further wherein each plastic layer making up said twist-wrap film is selected from the group consisting of partially crystalline polyolefin and amorphous cycloolefin copolymer, and wherein at least one additional layer consisting of partially crystalline polyolefin, uniform in its structure, directly adjoins each cycloolefin copolymer layer.

12. Twist-wrap film according to claim 11, wherein said one or more layers of partially crystalline polyolefin comprise an inner layer of a first partially crystalline polyolefin and outer layers of a second partially crystalline polyolefin directly adjoining opposite sides of said inner layer, wherein said second partially crystalline polyolefin is different than said first partially crystalline polyolefin, further wherein said first side and said opposite side of said one or more layers of partially crystalline polyolefin are formed by said outer layers.

13. Twist-wrap film according to claim 11, wherein each of said one or more layers of partially crystalline polyolefin consists of polypropylene or polyethylene.

14. Twist-wrap film according to claim 11, wherein each of said one or more layers of partially crystalline polyolefin is in the form of homo-PP, random-PP or LLDPE.

* * * * *